United States Patent [19]

Tanaka et al.

[11] Patent Number: 5,027,022

[45] Date of Patent: Jun. 25, 1991

[54] REVERSE ROTATION PREVENTING MECHANISM FOR SYNCHRONOUS MOTORS

[75] Inventors: Kanichi Tanaka, Chiryu; Shigeru Iguchi, Kani, both of Japan

[73] Assignee: Tokai Rika Denki Seisakusho Co., Aichi, Japan

[21] Appl. No.: 545,619

[22] Filed: Jun. 29, 1990

[30] Foreign Application Priority Data

Jul. 14, 1989 [JP] Japan ................. 1-83255[U]

[51] Int. Cl.⁵ ............... H02K 7/108; F16D 11/00
[52] U.S. Cl. ................................ 310/78; 192/41 R
[58] Field of Search ............ 74/DIG. 10; 310/41, 310/43, 78, 83; 192/41 R, 41 S, 46

[56] References Cited

U.S. PATENT DOCUMENTS 2,766,863 10/1956 Berg ....................... 310/41

FOREIGN PATENT DOCUMENTS 7708864 6/1978 Netherlands ............ 74/DIG. 10

OTHER PUBLICATIONS

Cheney, "Mechanical Joining of Plastics", *Product Engineering*, Sep. 1958, G2–G5.

Primary Examiner—Steven L. Stephan
Assistant Examiner—D. L. Rebsch
Attorney, Agent, or Firm—Foley & Lardner

[57] ABSTRACT

A reverse rotation preventing mechanism for synchronous motors includes a stopper interposed between a frame of a synchronous motor and a suitable stationary member, the stopper, including a stopping portion having elasticity and a rotating member fixed to a rotor shaft of the synchronous motor, and the rotating member, including a metallic flywheel and a gear disposed on the central portion of the flywheel, the flywheel having an engagement portion. The engagement portion of the flywheel of the rotating member is engaged with the stopping portion of the stopper when the synchronous motor is rotated in the direction opposite to a predetermined direction.

2 Claims, 3 Drawing Sheets

REVERSE ROTATION PREVENTING MECHANISM FOR SYNCHRONOUS MOTORS

BACKGROUND OF THE INVENTION

This invention relates to a reverse rotation preventing mechanism for synchronous motors wherein the direction of rotation of the synchronous motor is regulated.

Synchronous motors and particularly, those of the inductor type have a characteristic that a shaft rotates in either direction in accordance with the polarity of input power source waveforms at the starting Accordingly, when such a synchronous motor is employed as a drive source so that a load is driven through, for example, a reduction gear mechanism, a reverse rotation preventing mechanism is usually provided for rotating the synchronous motor in a predetermined direction.

FIGS. 8 and 9 illustrate the major part of a conventional reverse rotation preventing mechanism for synchronous motors. A reduction gear mechanism of which only a first-stage gear 1 is shown is provided for driving a load. The first-stage gear 1 of the reduction gear mechanism is formed from a sintered alloy integrally with a flywheel 2. The flywheel 2 has two mounting projections 2a formed on the underside thereof An engagement member 3 comprises a leaf spring formed from phosphor bronze. The engagement member 3 has two ends and is formed into a generally annular configuration. The engagement member 3 is inclined downwardly as it goes from a base end 3a to the other end engaging portion 3b The base end 3a has two mounting openings 3c formed therein. The mounting projections 3c are inserted in the mounting openings 3c, respectively and subsequently, the engagement member 3 is mounted on the flywheel 2 by caulking the mounting projections 2a.

The gear 1 is secured to a rotor shaft of a synchronous motor (not shown). When the rotor is rotated at the starting in the direction opposite to the normal direction, the engaging portion 3b of the engagement member 3 is elastically engaged with a stopping portion (not shown) mounted on a frame of the synchronous motor. Consequently, an elastic reaction force causes the rotor to rotate in the normal direction.

However, since the engagement member 3 is mounted on the flywheel 2 by way of caulking in the above-described conventional construction, the engagement member 3 tends to be deformed during assembling resulting in failure in engagement of the stopping portion with the engaging portion 3b of the engagement member 3 or insufficient engagement therebetween. Consequently, the reverse rotation preventing mechanism does not function properly.

Furthermore, when the load driven through the reduction gear mechanism is relatively light for the synchronous motor, each gear of the reduction gear mechanism is usually formed of a synthetic resin. However, in the above-described conventional construction, the first-stage gear 1 is formed from a sintered alloy and the second-stage gear engaging the first-stage gear is formed of the synthetic resin and consequently, the second-stage gear is apt to wear, thus entailing the problem of durability of the gear.

SUMMARY OF THE INVENTION

Therefore, an object of the present invention is to provide a reverse rotation preventing mechanism for synchronous motors wherein a rotor of the synchronous motor can reliably be prevented from being reverse rotated.

Another object of the invention is to provide a reverse rotation preventing mechanism for synchronous motors wherein the durability of a reduction gear mechanism through which a load is driven can be improved.

Further another object of the invention is to provide a reverse rotation preventing mechanism wherein the durability of a stopper composing the mechanism can be improved.

In order to achieve these and other objects, the present invention provides a reverse rotation preventing mechanism for synchronous motors, comprising a stopper interposed between a frame of a synchronous motor and a suitable stationary member to be fixed therebetween, the stopper including a stopping portion having elasticity and a rotating member fixed to a shaft of the synchronous motor, the rotating member including a metallic flywheel and a gear provided on the central portion of the flywheel, the flywheel having an engagement portion, whereby the engagement portion of the flywheel of the rotating member is engaged with the stopping portion of the stopper when the shaft of the synchronous motor is rotated in the direction opposite to a predetermined direction.

It is preferable that the gear provided on the central portion of the metallic flywheel be formed of a synthetic resin.

Furthermore, it is preferable that the stopper be formed by combining a leaf spring member having the stopping portion with a mount plate formed of a synthetic resin.

When the rotor of the synchronous motor is rotated in the direction opposite to the predetermined direction, the engagement portion of the rotating member is elastically engaged with the stopping portion of the stopper. Subsequently, a reaction force of spring force accumulated in the stopping portion causes the rotating member to rotate in the predetermined direction, which rotates the rotor in the predetermined direction.

Since the stopping portion of the stopper has springiness or elasticity and disposed between the motor frame and stationary member to be fixed therebetween, the stopper and particularly, the stopping portion thereof is prevented from being deformed during mounting of the stopper. As a result, the engagement portion of the rotating member is reliably engaged with the stopping portion of the stopper when the motor shaft is reverse rotated. Furthermore, since the gear of the rotating member is formed of a synthetic resin the next-stage gear which meshes with the rotating member gear and is also formed of the synthetic resin may be prevented from being worn, whereby the durability of the reduction gear mechanism is improved. Furthermore, since the stopper is formed by combining the leaf spring member with a mount plate, the durability thereof may be at the higher level than where it is formed from the synthetic resin.

Other objects of the invention will become obvious upon an understanding of the illustrative embodiments about to be described or will be indicated in the appended claims. Various advantages not referred to herein will occur to one skilled in the art upon employment of the invention in practice.

DESCRIPTION OF THE PREFERRED EMBODIMENT

An embodiment of the present invention will now be described with reference to FIGS. 1 to 6 of the drawings.

Figure 1:
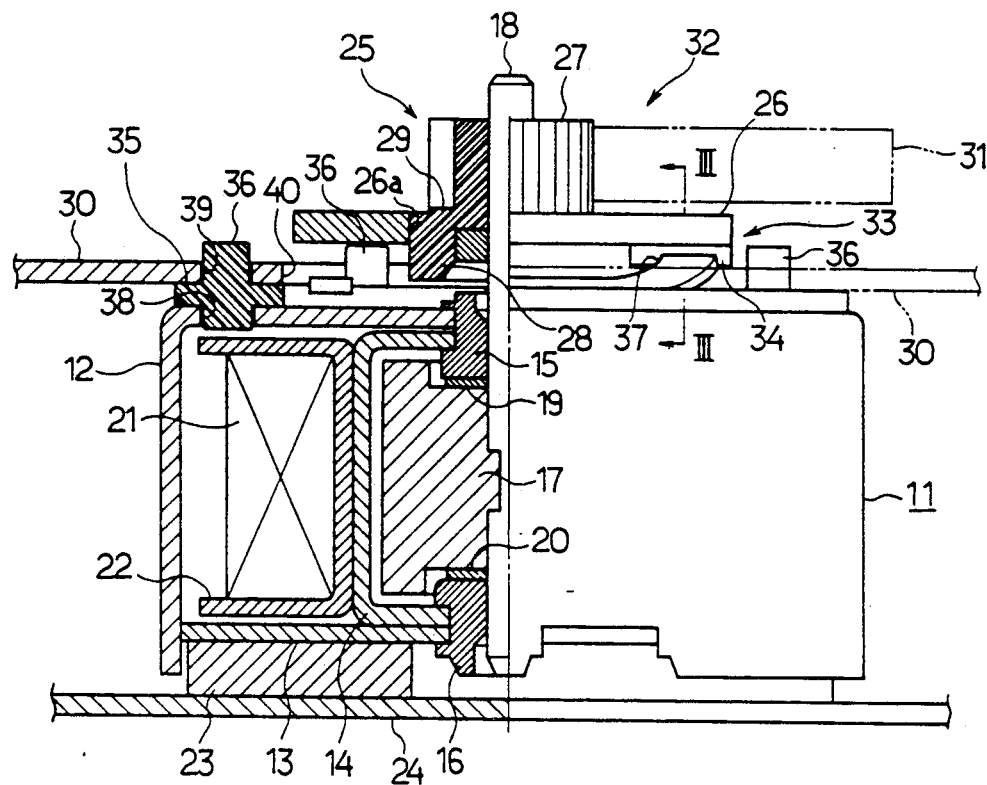
FIG. 1 is a partially sectional side view of a synchronous motor incorporating a reverse rotation preventing mechanism of an embodiment of the invention.
Figure 2:
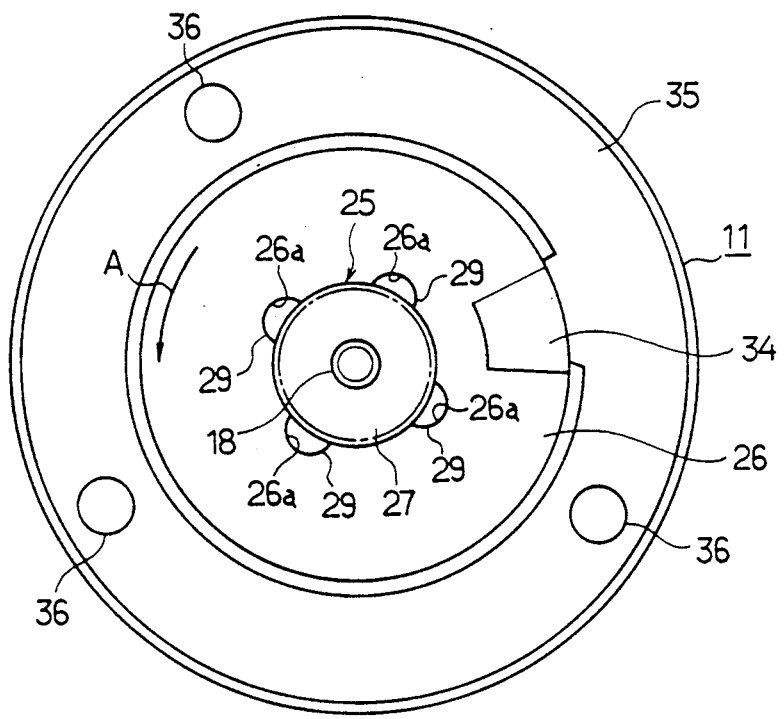
FIG. 2 is a top plan view of the synchronous motor.

Referring first to FIG. 1, reference numeral 11 designates a synchronous motor of the inductor type well known in the art. A generally cylindrical frame 12 has a closed upper end. An end plate 13 is mounted so as to close a lower open end of the frame 12 by way of caulking. A magnetic pole tooth 14 is disposed between the closed upper end wall of the frame 12 and end plate 13 by way of caulking. A bearing 15 is mounted through the central portions of top walls of the magnetic pole tooth 14 and frame 12. Another bearing 16 is mounted through the central portions of the bottom wall of the magnetic pole tooth 14 and end plate 13. A permanent magnet rotor 17 is disposed within the magnetic pole tooth 14 with a gap therebetween, and a rotor shaft 18 is rotatably mounted on the bearings 15 and 16. The upper end of the rotor shaft 18 is extended beyond the bearing 15. Washers 19 and 20 are provided between the rotor 17 and bearings 15, 16 respectively A stator coil 21 is wound on a winding frame 22. The stator coil 21 is positioned along the outer periphery of the magnetic pole tooth 14 between the frame 12 and end plate 13 and an alternating current is fed to the stator coil from an input terminal (not shown). A generally annular cushion or buffer member 23 is fixed by an adhesive to the underside of the end plate 13 of the synchronous motor thus constructed and further to the inner bottom surface of a motor casing 24.

A rotating member 25 will now be described with reference to FIGS. 1 to 6. A circular flywheel 26 is formed by punching from a metallic plate such as a brass plate. The flywheel 26 has four through-holes 26a formed in the central portion thereof. A gear 27 is formed from a suitable synthetic resin integrally with a retaining ring 28. The retaining ring 28 is coupled to the gear 27 through coupling portions 29 inserted into the holes 26a. The rotating member 25 thus constructed is fixed to the upper end of the rotor shaft 18 of the synchronous motor 11. The gear 27 is adapted to be engaged with a next-stage gear 31 formed of a suitable synthetic resin and mounted on a chassis 30. The gear 27 and gear 31 constitute a reduction gear mechanism 32 with other gears (not shown) formed of the synthetic resin. The last gear of the reduction gear mechanism 32 is coupled to a suitable load.

Figure 6:
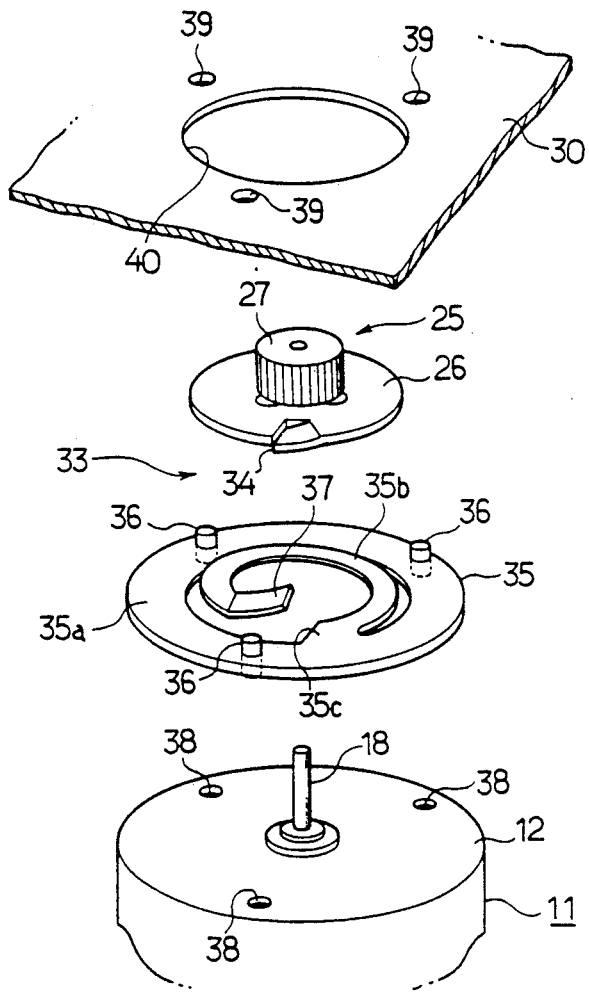
FIG. 6 is an exploded perspective view of the major part of the reverse rotation preventing mechanism.

Reference numeral 33 designates a reverse rotation preventing mechanism in accordance with the invention. An engagement portion 34 is formed by downwardly cutting a portion of the outer periphery of the flywheel 26 of the rotating member 25. A stopper 35 is formed of a synthetic resin and includes a generally annular base portion 35a. A plurality of, for example, three engagement projections 36 are integrally formed on the base portion 35a. The engagement projections 36 are projected both upwardly and downwardly from the base portion 35a of the stopper 35. Furthermore, a generally arc-shaped or annular spring portion 35b is formed integrally with the base portion 35a and thinner than the base portion 35a. The spring portion 35b is positioned inside the base portion 35a and has one end 35c extended integrally with the base portion 35a. A stopping portion 37 is formed on the other end of the spring portion 35b. The stopping portion 37 is directed obliquely upwardly, as shown in FIG. 6. The stopping portion 37 is placed on the upper wall of the frame 12 of the synchronous motor 12 such that the lower engagement projections 36 are fitted in engagement holes 38 formed in the upper wall of the frame 12, respectively and that the upper engagement projections 36 are fitted in engagement holes 39 formed in the chassis 30. Consequently, the base portion 35a of the stopper 35 is disposed between the upper wall of the frame 12 and the chassis 30 as a stationary member to be fixed therein. The stopping portion 37 of the stopper 35 is adapted to come into contact with the underside surface of the flywheel 26 of the rotating member 25. Furthermore, the stopping portion 37 is positioned on the rotational locus of the engagement portion 34. The rotating member 25 is upwardly projected through a hole 40 formed in the chassis 30.

Figure 4:
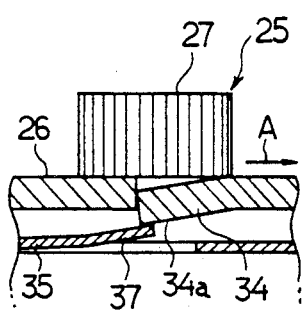
FIG. 4 is a view similar to FIG. 3 illustrating a different operative state of the reverse rotation preventing mechanism.
Figure 5:
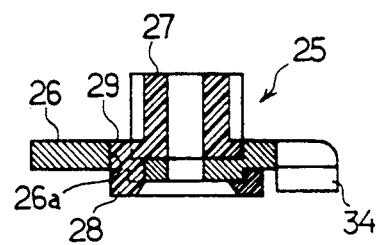
FIG. 5 is a longitudinal sectional view of a rotating member of the reverse rotation preventing mechanism.

In operation, when ac power is applied to the stator coil 21 of the synchronous motor 11 so that the motor is started, the rotor 17 and more specifically, the rotor shaft 18 is rotated in the direction of an arrow A as a predetermined direction. The motor rotation is transmitted to the reduction gear mechanism 32 having the gear 27 and gear 31. When the engagement portion 34 of the flywheel 26 is brought into contact with the stopping portion of the stopper 35, the engagement portion 34 pushes the stopping portion 37 at the underside surface 34a thereof. The engagement portion 34 passes the stopping portion 37 with the same elastically deformed, as shown in FIG. 4.

Figure 3:
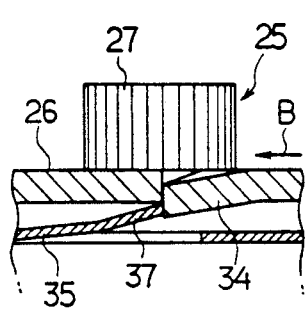
FIG. 3 is a sectional view taken along line III—III in FIG. 1.

In the case where the rotor shaft 18 is rotated in the direction of an arrow B, which direction is opposite to the predetermined direction of the arrow A, the engagement portion 34 of the rotating member 25 is engaged with the stopping portion 37 of the stopper 35 to be stopped thereby when brought into contact with the same, as shown in FIG. 3. Consequently, the spring portion 35b, undergoes flexural deformation, thereby accumulating a spring force. Then, a reaction force of the accumulated spring force causes the rotating member 25 to rotate in the direction opposite to that of the arrow B, that is, in the direction of the arrow A. As a result, the rotor shaft 18 and therefore, the rotor 17 is rotated in the predetermined direction of the arrow A.

In accordance with the above-described embodiment, the base portion 35a of the stopper 35 is fixed between the frame 12 and chassis 30 of the synchronous motor 11. The spring portion 35b and stopping portion 37 are independent of the base portion 35a. Accordingly, different from the conventional engagement member 3, the spring portion 35b and stopper 37 are prevented from being deformed as the result of the fixing of the base portion 35a. Consequently, the engagement portion 34 of the rotting member 25 is reliably engaged with the stopping portion 37 when the rotor 17 of the synchronous motor 11 is rotated in the direction opposite to the predetermined one, thereby ensuring the reverse rotation preventing operation. Furthermore, the gear 27 is integrally formed of the synthetic resin on the central portion of the flywheel 26, thereby forming the rotating member 25. The gear 27 is engaged with the next-stage gear 31 of the reduction gear mechanism 32. Consequently, the degree of wear of the gear 31 formed of the synthetic resin is improved as compared in the case where a metallic gear 27 is employed. Accordingly, the durability of the reduction gear mechanism 32 is improved. Further, since the flywheel 26 of the rotating member 25 is formed of a metallic plate such as a brass plate, a sufficient flywheel effect may be obtained.

Figure 7:
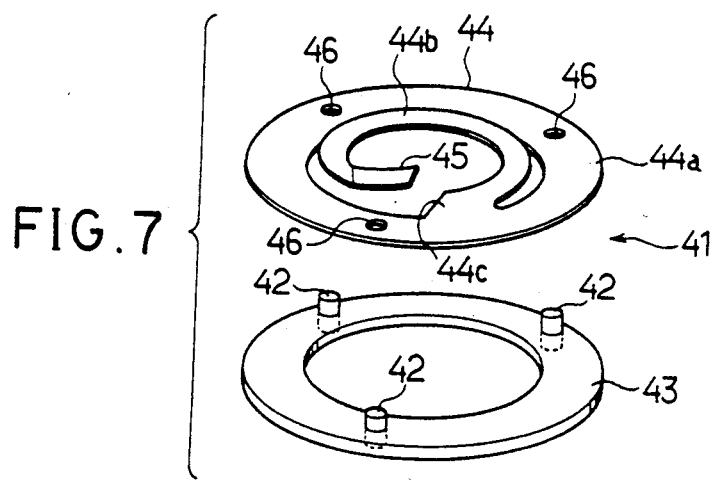
FIG. 7 is an exploded perspective view a stopper employed in the reverse rotation preventing mechanism of a second embodiment.
Figure 8:
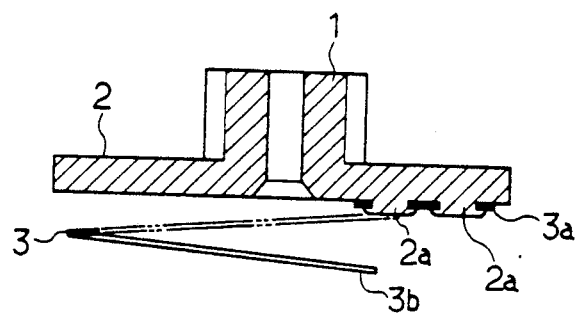
FIG. 8 is a longitudinal sectional view of a gear, flywheel and engaging member of a conventional reverse rotation preventing mechanism.
Figure 9:
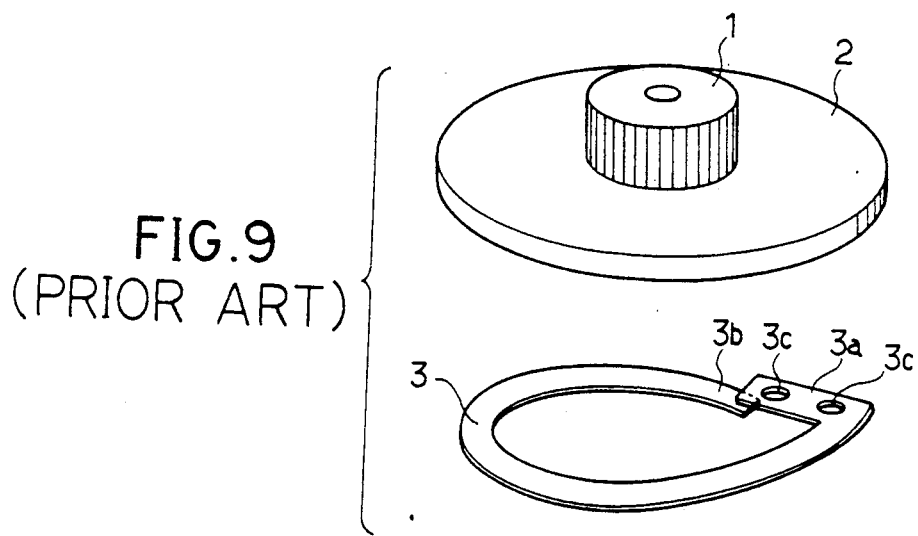
FIG. 9 is an exploded perspective view of the parts shown in FIG. 8.

FIG. 7 illustrates a second embodiment of the invention. A stopper 41 is employed for the stopper 35. The stopper 41 includes an annular mount plate 43 formed of a synthetic resin and a spring member 44 formed of a phosphor bronze leaf spring The mount plate 43 has three engagement projections 42 as the mounting projections 36 in the foregoing embodiment. The spring member 44 includes a base portion 44a, spring portion 44b, base end portion 44c and stopping portion 45, as the stopper 35. The base portion 44a of the spring member 44 has three engagement holes 46 formed therein so that the holes correspond to the engagement projections 42 respectively. The engagement projections 42 are inserted in the engagement holes 46 respectively so that the base portion 44a of the spring member 44 is laminated with the mount plate 43.

In accordance with the second embodiment, the durability of the stopper 41 may be improved as compared with the stopper 35 in the previous embodiment.

The foregoing disclosure and drawings are merely illustrative of the principles of the present invention and are not to be interpreted in the limiting sense. The only limitation is to be determined from the scope of the appended claims.

What we claim is:

1. A reverse rotation preventing mechanism for synchronous motors, comprising:
   (a) a stopper formed of synthetic resin comprising a base portion having a generally central opening and a generally thin annular spring portion positioned in the opening and having a predetermined springiness, the base portion being fixedly located between a frame of a synchronous motor and a suitable stationary member, the base portion having an upper side and a lower side and at least two positioning projections integrally formed in an outer periphery of the base portion and extending outwardly from both the upper side and lower side of the base portion, the spring portion being integrally formed with the base portion and having a distal end with a stopping portion which is obliquely angled in an upward direction;
   (b) a rotating member fixed to a rotor shaft of the synchronous motor, the rotating member including a metallic flywheel and a molded synthetic resin pinion gear connected to a central portion of the flywheel, the flywheel having at least one engagement portion formed on an outer periphery of the flywheel; and
   (c) positioning holes formed in the motor frame and the stationary member, wherein the positioning projections are inserted in the respective positioning holes so that the base portion of the stopper is located between the motor frame and the stationary member, wherein the engagement portion of the flywheel is engaged with the stopping portion when the synchronous motor is rotated in a direction opposite to a predetermined direction, and wherein the engagement portion slides on the stopping portion and pushes the stopping portion down when the motor is rotated in the predetermined direction which allows the motor to continuously rotate in the predetermined direction.

2. A reverse rotation preventing mechanism for synchronous motors comprising:
   (a) a stopper comprising a spring member formed of a spring steel and a generally annular mount plate formed of a synthetic resin, having at least two positioning projections formed on an upper side and a lower side of the mount plate, said spring member including a generally annular base portion positioned on one side of the mount plate and formed with positioning holes, wherein said positioning projections are inserted in the positioning holes so that the spring member is retained on said mount plate, said spring member further comprising a generally thin annular spring portion which is integrally formed with and extends from the base portion and which is positioned in a generally central opening formed in the base portion, the spring portion having a distal end with a stopping portion which is obliquely angled in an upward direction;
   (b) a rotating member fixed to a rotor shaft of the synchronous motor, the rotating member including a metallic flywheel and a molded synthetic resin pinion gear connected to a central portion of the flywheel, the flywheel having at least one engagement portion formed on an outer periphery of the flywheel; and
   (c) positioning holes formed in the motor frame and the stationary member, wherein the positioning projections are inserted in the respective positioning holes so that the base portion of the stopper is located between the motor frame and the stationary member, wherein the engagement portion of the flywheel is engaged with the stopping portion when the synchronous motor is rotated in a direction opposite to a predetermined direction, and wherein the engagement portion slides on the stopping portion and pushes the stopping portion down when the motor is rotated in the predetermined direction which allows the motor to continuously rotate in the predetermined direction.

* * * * *